Feb. 6, 1923.
W. KLABUNDA.
VEHICLE DIRECTION INDICATOR.
FILED MAY 2, 1921.
1,443,956
2 SHEETS-SHEET 1
Fig. 1.
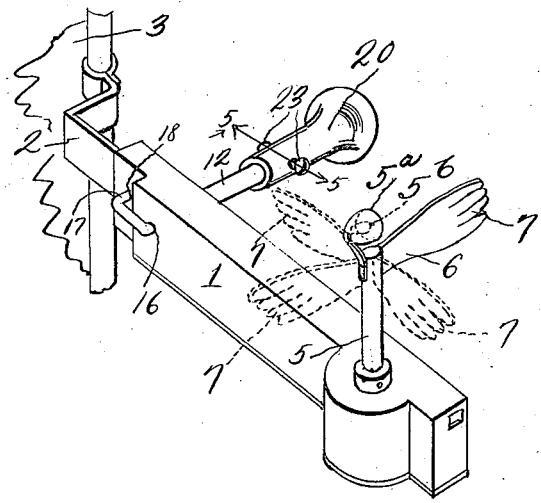
Fig. 5.
Fig. 6.
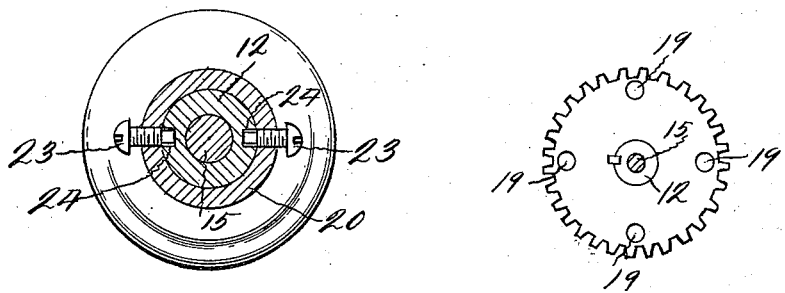

Feb. 6, 1923. 1,443,956
W. KLABUNDA.
VEHICLE DIRECTION INDICATOR.
FILED MAY 2, 1921. 2 SHEETS-SHEET 2

Inventor
William Klabunda
By Philip A. H. Serrell
Attorney

Patented Feb. 6, 1923.

1,443,956

UNITED STATES PATENT OFFICE.

WILLIAM KLABUNDA, OF FLORENCE, NEBRASKA.

VEHICLE DIRECTION INDICATOR.

Application filed May 2, 1921. Serial No. 466,011.

*To all whom it may concern:*

Be it known that WILLIAM KLABUNDA, a citizen of the United States, residing at Florence, in the county of Douglas and State of Nebraska, has invented certain new and useful Improvements in Vehicle Direction Indicators, of which the following is a specification, reference being had therein to the accompanying drawing.

The invention relates to vehicle direction indicators and has for its object to provide a device of this character comprising an indicating arm, which indicating arm may be positioned and held in various positions through rack and gear means carried within a casing supported on a vehicle. Also to provide one of the gears with a sleeve, in which sleeve is slidably mounted a shaft which extends through the gearing, the casing and terminates in a portion parallel with the shaft, which portion is adapted to be received by apertures in the gear after said gear has been rotated to position the indicating arm. A slidable handle is provided on the sleeve, by means of which handle the shaft in the sleeve may be forced outwardly for releasing the gear against the action of a spring thereby allowing the gear to be rotated for positioning the indicating arm, and when released, allowing the locking of the gear against rotation.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of the device, showing the same secured to a vehicle windshield.

Figure 5 is a sectional view taken on line 5—5 of Figure 1.

Figure 6 is a front elevation of the apertured gear.

Figure 2:
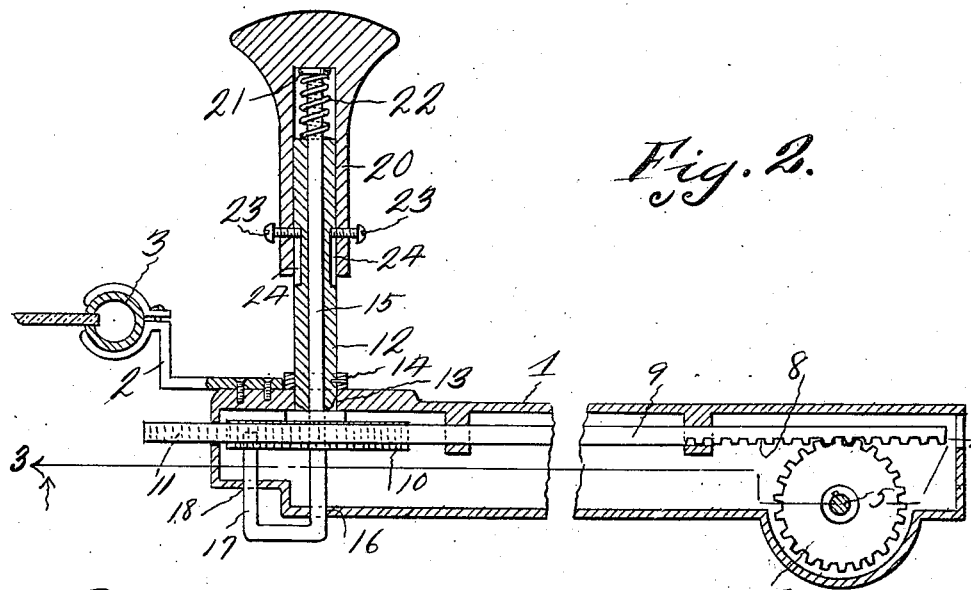
Figure 2 is a horizontal sectional view through the device.
Figure 3:
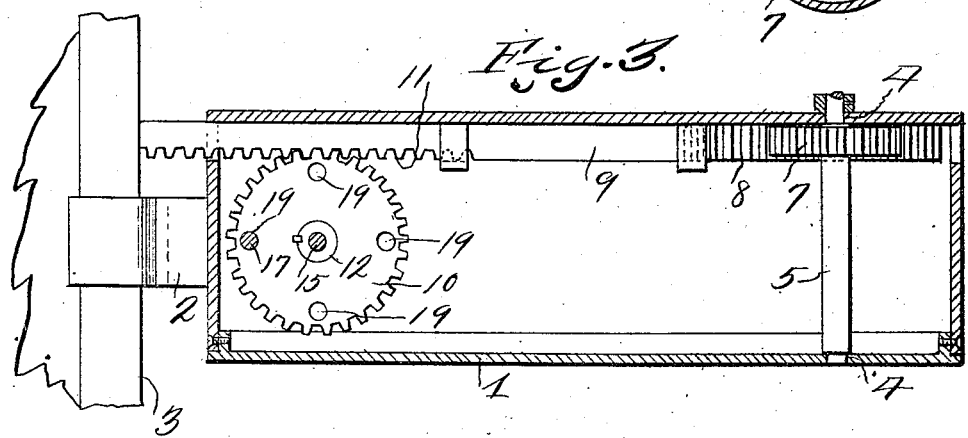
Figure 3 is a longitudinal vertical section taken on line 3—3 of Figure 2.
Figure 4:
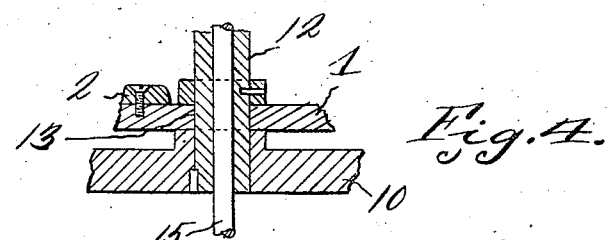
Figure 4 is a detail sectional view through a portion of one of the gears, its sleeve and a portion of a casing.

Referring to the drawings, the numeral 1 designates an elongated horizontally disposed casing, which casing is provided with a bracket 2 which supports the casing on the windshield 3. Vertically disposed and rotatable in bearings 4 of the casing adjacent its outer end is a shaft 5, to the upper end of which shaft at a point above the casing 1 is secured a horizontally disposed arm 6 having a signal member 7 at its outer end, which member is adapted to be positioned in various positions for signalling approaching vehicles from either direction. Secured to the shaft 5 adjacent its upper end and within the casing 1 is a gear 7 with which gear 7 a horizontally disposed rack 8 meshes, said rack being carried by a slidable bar 9, slidably mounted in bearings within the casing 1. Disposed within the casing 1 and below the bar 9 is a gear 10, which gear meshes with a rack 11 carried by the under face of the bar 9, and by means of which gear 10, the bar 9 is moved longitudinally for rotating the gear 7 and variously positioning the horizontally disposed arm 6.

The gear 10 is provided with a sleeve 12 which is rotatably mounted in a bearing 13 of the casing 1, and is held against longitudinal movement in said bearing 13 by means of a collar 14. It will be seen that when the sleeeve 12 is rotated that the arm 6 will be moved in a horizontal plane through its gear and rack connections with the sleeve 12. Slidably mounted within the sleeve 12 is a shaft 15, which shaft extends through the gear 10 and through a bearing 16 in the casing 1, said shaft being provided with a rearwardly extending arm 17 which is parallel with the shaft 15. The arm 17 extends through an aperture 18 in the casing and its end is adapted to be received by any of the apertures 19 in the gear 10, and when so positioned prevent the rotation of gear 10 and consequently hold the arm 6 against movement and in the position to which it may have been moved. Slidably mounted on the end of the sleeve 12 is a handle member 20 and between the end of the sleeve 12 and the enlargement 21 of the shaft 15, a coiled spring 22 is interposed, which coiled spring normally maintains the shaft 15 in rearward position as shown in Figure 2 and the arm 17 in engagement with one of the apertures 19 in the gear 10, thereby holding the signalling device in any position to which it may have been placed. Extending through the sleeve of the handle member 20 are screws 23 which extend into elongated slots 24 in the sleeve 12. It will be seen that the handle member 20 is slidably mounted on the sleeve 12, and that when it is desired to move the horizontally disposed arm 6, the operator grasps the handle member 20, forces the same inwardly, which action will move the shaft 15 longitudinally in the sleeve 12 and then simultaneously move the arm 17 out of engagement with the aperture 19 and gear 10, thereby unlocking the gear 10. After the unlocking operation the operator rotates the handle 20, which action will cause the sleeve 12 and gear 10 to also rotate and consequently move the arm 6 to the position desired, at which time upon releasing the handle the inner end of the arm 17 will move into engagement with one of the apertures 19 of the gear 10 and be held therein by the coiled spring 22.

From the above it will be seen that a vehicle direction signal is provided which is simple in construction and one wherein the operation is positive. For purposes of illustration the device has been shown in a horizontal position, however, it is to be understood that it may be vertically positioned or positioned at any angle desired.

If desired a reflector 5ª may be carried by the shaft 5 and a light 5ᵇ placed therein in such a manner as to be reflected on the signal member 7. By providing the light 7, it will be seen that the device may be utilized at night.

The invention having been set forth what is claimed as new and useful is:—

A vehicle direction indicator comprising a casing, a vertically disposed shaft carried in said casing adjacent its outer end, an indicating arm carried by said shaft and disposed outside of the casing, a horizontally disposed gear carried by said casing adjacent its inner end, a gear carried by the vertically disposed shaft, rack bar connections between said gear and the gear carried by the vertically disposed shaft, a sleeve carried by the horizontally disposed gear and rotatably mounted in a bearing of the casing, a shaft slidably mounted in said sleeve and having its outer end extending through an aperture in the casing in axial alignment with the horizontal gear, an arm carried by the outer end of the shaft and extending inwardly through an aperture in the casing and adapted to be received by apertures in the horizontally disposed gear for holding said gear against rotation, a coiled spring interposed between the end of the sleeve and an enlargement of the shaft, a longitudinally slidable handle member carried by the sleeve and housing the spring and the end of the shaft and forming means whereby said shaft may be moved longitudinally the horizontal gear released and the sleeve and gear rotated.

In testimony whereof I hereunto affix my signature.

WILLIAM KLABUNDA.